Patented Jan. 20, 1953

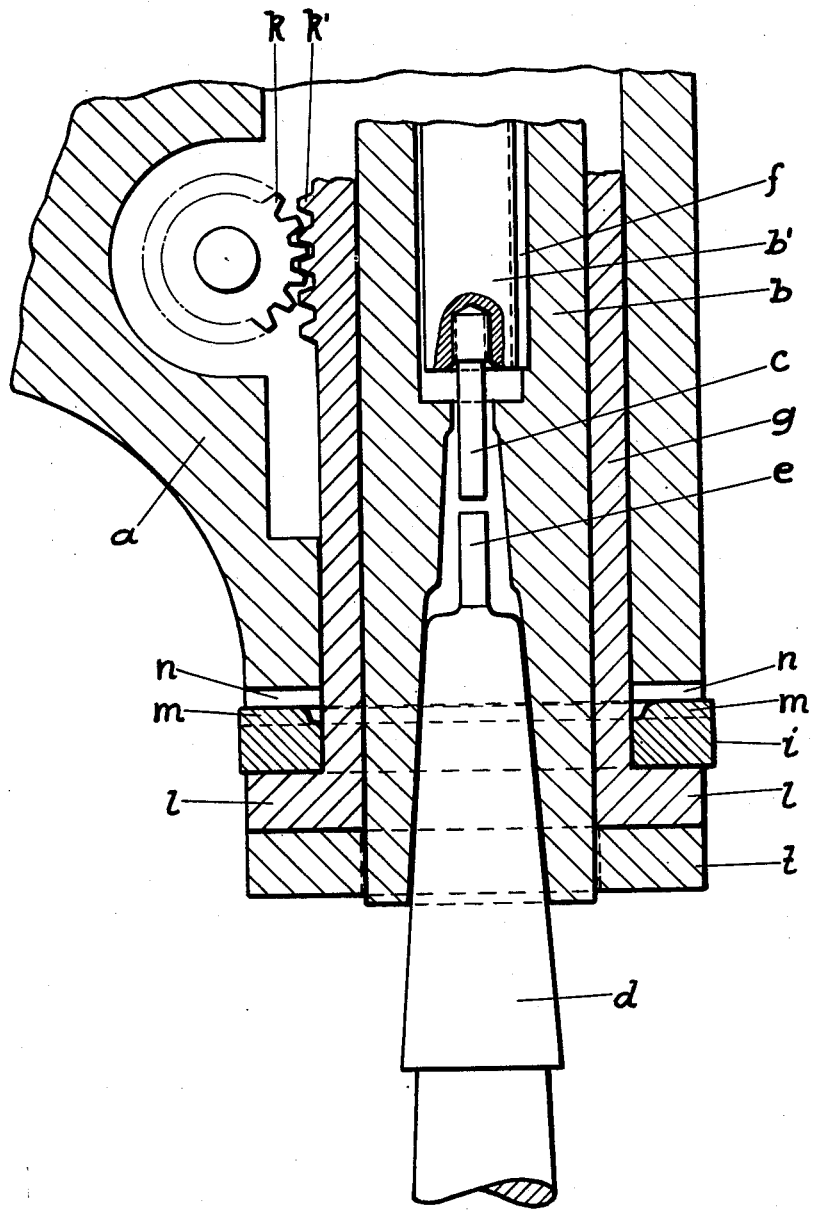

2,625,845

UNITED STATES PATENT OFFICE 2,625,845

MACHINE SPINDLE DEVICE

Curt Lorentz Thelning, Stockholm, Sweden

Application August 7, 1947, Serial No. 767,089
In Sweden April 2, 1946

Section 1, Public Law 690, August 8, 1946
Patent expires April 2, 1966

1 Claim. (Cl. 77—55)

To simplify fitting detachable tools or insertion sleeves, serving as tool holders in machine spindles, the external driving device of the machine spindle is provided with an internally adapted, motor-driven shaft, which is stationary with respect to the framework of the machine spindle and therefore may serve as a support or holder for a tool-stop which stop serves to facilitate the removal of the tool or the sleeve from the machine spindle.

This invention relates to a device in connection with a machine spindle driven by an internal motor-driven shaft located in a spindle stationary in an axial direction, and which is rotary mounted in a feed-sleeve by means of which, during operation, it is moved in an axial direction (up and down or back and forth) and which is designed to receive a tool or a cone-shaped insertion-sleeve for attaching the tool, which may be detached from the machine spindle when this in its maximum return motion in the direction of the driving shaft strikes a stop carried on the latter.

By this arrangement machines equipped with the above internal driving shaft may easily be made more complete, so that the tool or insertion-sleeve is loosened by a simple manual operation. In addition, by forming the upper end of the insertion-sleeve in such a manner (e. g. as a round pin), that it may be placed in the machine spindle while this is in motion, which is easily accomplished, the operation is considerably simplified.

A practical embodiment of the invention is shown in the single figure of the accompanying drawing, taken in connection with the following description.

Referring to the drawing the letter $a$ designates a part of the framework, and $b$ the machine spindle. Said spindle is rotatably mounted in the above mentioned feed-sleeve, indicated by $g$, which as usual may be elevated or lowered but does not rotate in the framework. It is as usual moved up and down by means of a pinion $k$, the teeth of which engage with a rack $k^1$ fixed to the sleeve $g$. Inside the machine spindle the motor-driven shaft $b^1$ is located, which turns the outer spindle $b$ but does not take part in its vertical movement. The mechanical connection of the two spindles allowing said relative movements is exemplified by a cotter key $f$. The cone-shaped insertion-sleeve designated by $d$, is shown inserted in the machine spindle $b$.

According to the invention, the driving shaft $b^1$ is elongated with a pin $c$ of such length, that the sleeve $d$, inserted in the machine spindle, in the uppermost position of the latter strikes against this pin and is loosened.

This arrangement thus permits the detachment of the insertion-sleeve $d$ from the machine spindle when the latter is returned to its uppermost position. In actual operation, however, it is desirable to ascertain that the machine spindle is not returned too far so that the insertion-sleeve is forced out prematurely. To prevent this and thereby to increase the reliability of service a ring-shaped stop or limit device $i$ is provided between a flange $l$ of the feed-sleeve $g$ and the framework $a$. This ring is turnable around the sleeve $g$, and its upper surface is provided with shoulders $m$. Each shoulder corresponds to a notch $n$ in the lower ring surface of the framework and the ring $i$ is so fitted, that these shoulders must engage with the notches to enable the elevation of the sleeve $g$ to such a position, that the sleeve $d$ will strike against the pin $c$.

The insertion-sleeve $d$ is fastened by quickly forcing it upwards in the machine spindle. If the upper end portion $e$ is given a circular cross section, as shown in Fig. 3, it is possible to fasten the sleeve even when the machine spindle is in full motion, which may take place by a rapid manual motion. In actual operation the ring is adjusted so that the shoulders $m$ are seated under the corresponding shoulders on the frame $a$ of the machine. In this position the parts appear as shown in the drawing, with the pin $c$ and portion $e$ of sleeve $d$ disengaged. If it is desired to eject the sleeve $d$ from the spindle, the ring $i$ is partially rotated to bring the shoulders $m$ under the notches $n$ in the frame. Operation of the pinion $k$ will then raise the sleeve $g$, carrying with it the spindle $b$ and sleeve $d$ to bring the portion $e$ into contact with pin $c$ and cause ejection of the sleeve $d$ from the spindle $b$.

The letter $t$ designates a retaining ring fixed to or made integral with the lower end of the spindle $b$.

Having now described my invention, what I claim as new and desire to secure by Letters Patent is:

A machine spindle device comprising a frame member, a flanged sleeve positioned within said frame and being axially movable therein, the flanged portion extending below said frame, a spindle within said sleeve mounted for axial and rotational movement therein and having a tool receiving socket, said spindle having a retaining ring at its free end, said flange resting on said ring; a limiting stop member rotatable about said sleeve between said flange and frame member, said ring having alternating abutments and depressions thereon, said frame member having corresponding, facing, abutments and depressions, an axially stationary shaft for driving said spindle extending into said spindle, said spindle being axially movable with respect to said shaft, a tool knockout member carried by the end of said shaft and extending into said tool receiving socket for engagement with a tool, means for moving said spindle and sleeve in an axial direction, said spindle and sleeve being movable to bring said knockout member into operative contact with a tool in said socket when said limiting stop member is positioned with said abutments facing the depressions on said frame member and is interlocked therewith, said knockout member being rendered inoperative when said limiting stop member is rotated so as to bring the abutments thereof into position facing the abutments on said frame member to prevent interlocking of said stop member and frame.

CURT LORENTZ THELNING.

REFERENCES CITED

The following references are of record in the file of this patent:

UNITED STATES PATENTS

| Number | Name | Date |
|---|---|---|
| 762,647 | Mullinnix | June 14, 1904 |
| 982,740 | Mullinnix | Jan. 24, 1911 |
| 1,125,147 | Merliss | Jan. 19, 1915 |
| 1,761,181 | Chace | June 3, 1930 |
| 2,341,051 | Lustrik | Feb. 8, 1944 |

FOREIGN PATENTS

| Number | Country | Date |
|---|---|---|
| 57,255 | Austria | Jan. 10, 1913 |
| 69,627 | Norway | Oct. 8, 1945 |
| 168,210 | Switzerland | Sept. 1, 1934 |
| 212,896 | Switzerland | Mar. 17, 1941 |
| 48,834 | Germany | Jan. 12, 1889 |